May 14, 1957 R. N. RHODES 2,792,496
STABILIZED DIRECT CURRENT SETTING APPARATUS
Filed Sept. 24, 1953
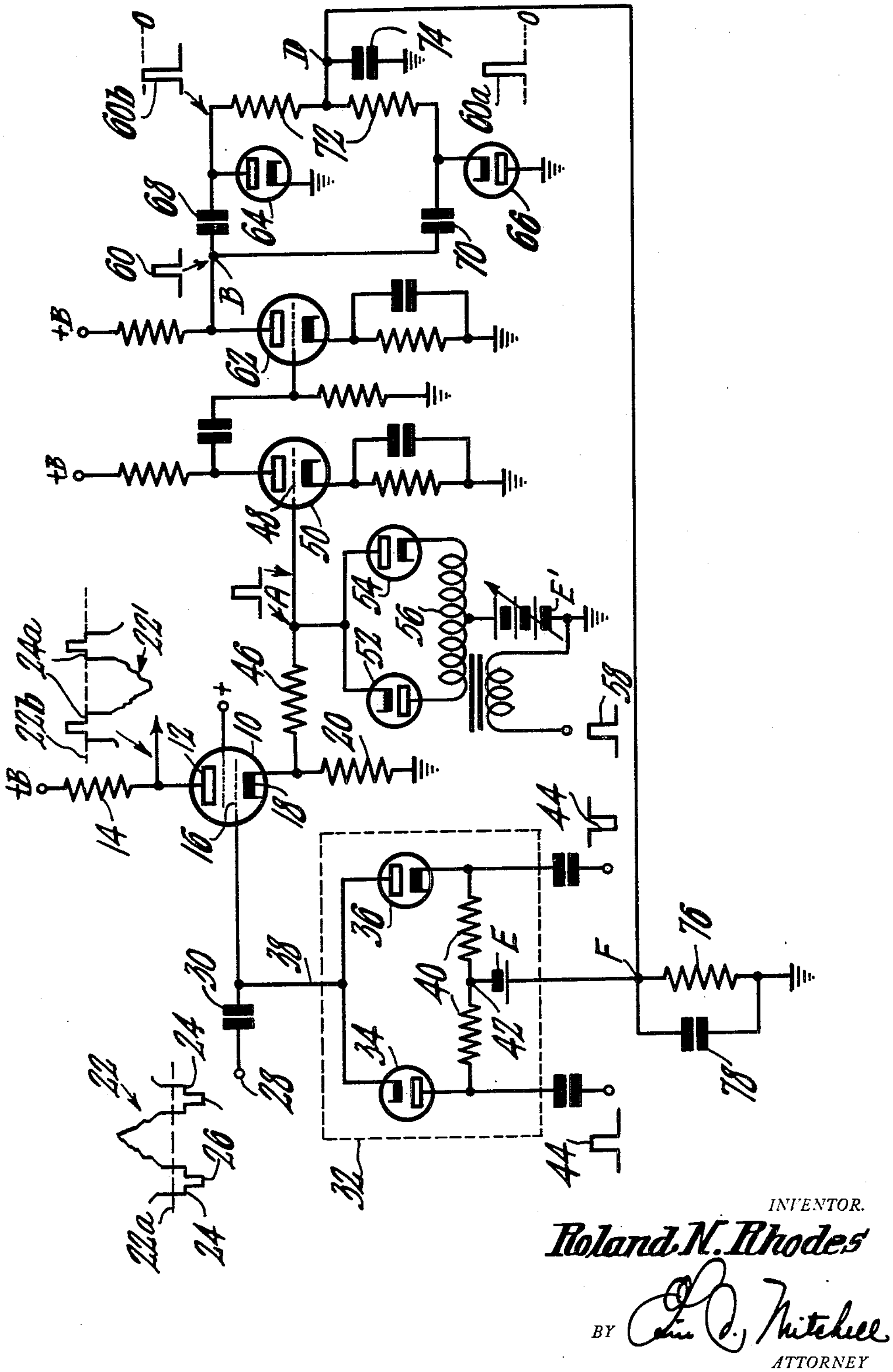
INVENTOR.
Roland N. Rhodes
BY [signature]
ATTORNEY United States Patent Office 2,792,496

Patented May 14, 1957

2,792,496

STABILIZED DIRECT CURRENT SETTING APPARATUS

Roland N. Rhodes, Levittown, Pa., assignor to Radio Corporation of America, a corporation of Delaware Application September 24, 1953, Serial No. 382,130

9 Claims. (Cl. 250—27)

The present invention relates to new and improved apparatus for use in restoring low frequency and direct current components of a signal and for accurately setting the level of direct current conduction of an electron discharge device.

More particularly, although not necessarily exclusively, the invention relates to such apparatus as is suitable for use in connection with circuits for processing a television signal, which as those skilled in the art will recognize, requires restoration of its direct current component for accurate representation of the picture information. According to present television standards, a scene is imaged onto a suitable pickup device, converted into an electrical signal representative of light values of elemental areas and transmitted to a signal-processing device which may include non-conductive coupling means for applying the signal to an image reproducing device. Since the light values are relative to a given background brightness level represented by the D.-C. component of the signal, it is necessary that, at certain points in the transmitter-receiver system, the composite signal be referred to a given level. Where such points are preceded by a non-conductive coupling such as a capacitor, for example, the D.-C. component must be effectively restored. A well known instance of D.-C. restoration is that which is ordinarily provided at the input electrode of the image-reproducing kinescope.

Further in accordance with existing standards, synchronism of receiver scanning with that of the transmitter is effected by the transmission of line- and field-rate synchronizing signals which are superimposed on blanking pedestals during recurring retrace intervals. These blanking pedestals are ordinarily selected at some arbitrary, predetermined level corresponding to black, for example, which, in turn, may correspond to kinescope cutoff. In view of the necessity for restoring D.-C. components and for properly setting the conduction level of the image-reproducing device in a television receiver, there have been many proposals for accomplishing the stated ends. For example, D.-C. restorers have been proposed which include a biased diode designed to "align" the sync pulse peaks along a given reference line, thereby re-establishing the D.-C. level in a signal which would otherwise be balanced about its A.-C. axis. An arrangement of this type when connected to a control electrode of an electron discharge device, for example, has also been found to be generally effective as a means for clamping that electrode at a desired level whereby to set the D.-C. level in the discharge device.

Various improvements have been made in the art to which this invention appertains, including the use of keyed clamp circuits such as that described and claimed in U. S. Patent No. 2,299,945 granted October 27, 1942 to K. R. Wendt. According to the Wendt patent, there is provided a pair of diodes whose opposite electrodes are connected to the control electrode of the tube to be clamped. A path connecting the other electrodes of the diodes includes an A.-C. midpoint whose actual potential with respect to a fixed level of voltage is set by a fixed level of bias or "level setting means." The diodes are normally non-conducting but are rendered conductive at predetermined times and for set intervals which encompass the recurring blanking portions of the composite signal, which portions were originally fixed in level. In this fashion, a capacitor is permitted to gain or lose charge depending upon the requirements of the signal in order to set the fixed level.

It is a primary object of the present invention to provide new and improved apparatus of the general type described and which constitutes an improvement over the apparatus of the Wendt patent.

More specifically, it is an important object hereof to provide improved means for reinserting the D.-C. and low frequency components of a signal such as a television signal and for concurrently establishing a fixed level of conduction in an electron discharge device.

In general, the present invention contemplates the provision of keyed means for sampling the current in the space discharge circuit of the tube whose D.-C. level is being set, means for comparing a voltage developed in that fashion with a standard or reference voltage, and means for measuring and rectifying the difference between the two voltages whereby to develop a bias for a keyed clamp of the above-described Wendt type. Accordingly, in addition to restoring the D.-C. level to the signal being applied to the tube, the apparatus of the present invention sets the level of direct current in the tube at a precise level rather than by an arbitrary bias source for the keyed clamp circuit. Moreover, it will further be appreciated that the operation of the keyed sampling means of this invention exerts substantially no influence on the tube operation by reason of its sampling, as is the case in certain known apparatus.

Circuitry for D.-C. level-setting employing means for detecting the state of conduction of a kinescope during recurring reference intervals is disclosed in U. S. Patent 2,259,538, granted to H. A. Wheeler, October 21, 1941. In the Wheeler circuitry, the cathode of a kinescope is provided with a path to ground comprising a normally conducting triode which is cut off during blanking intervals, whereby to develop a signal indicative of the tube's conduction at those times. While the opening of a cathode circuit of a kinescope during blanking is ordinarily not undesirable, there are many cases in which it is preferable to effect a sampling without affecting the operation of the tube under consideration.

It is, therefore, a further object of the present invention to provide novel means for D.-C. level setting in an electron discharge device, which means are operative without altering even momentarily the path of conduction of such device.

Additional objects and advantages of the present invention will become apparent to persons skilled in the art from a study of the following detailed description of the accompanying drawing which illustrates a circuit embodying the principles of the invention.

Referring to the drawing, an electron discharge device 10 is shown, by way of illustration, as comprising a conventional vacuum tube amplifier having an anode 12 connected via a load resistor 14 to a source of positive potential indicated as "+B." The amplifier 10 further includes a control electrode 16 and a cathode 18 which is connected to ground through a resistor 20. It should be noted at this point that the invention is suitable for use at substantially any point in a transmitter-receiver system at which it is desirable to restore lost D.-C. and low frequency components of a signal and also to set the level of conduction of the stage in an accurate manner. A signal illustrated as a video signal 22 having blanking pedestals 24 and sync pulses 26 is applied to the input terminal 28 for application to the control electrode 16 of electron discharge device. The signal is actually applied to the tube via a capacitor 30 which effectively removes direct current and low frequency components of the signal so that the signal is averaged about its A.-C. axis indicated by the dotted line 22*a*, rather than having its blanking pedestals 24 in alignment.

In order to restore the D.-C. and low frequency components of the signal, there is connected to the control electrode of the electron discharge device 10 a D.-C. restorer circuit 32 of the keyed clamp variety described and claimed in the above-cited Wendt patent. Since the operation of the clamp circuit is described in great detail in the Wendt patent, its operation need not be afforded a detailed description here. In brief, however, the keyed clamp circuit 32 comprises a pair of diodes 34 and 36, the cathode of diode 34 and the anode of diode 36 being connected to each other and to the control electrode 16 via lead 38. The anode of diode 34 and cathode of diode 36 are connected to opposite ends of resistor 40 whose midpoint 42 constitutes the A.-C. midpoint of the diode loop and is connected to the negative terminal of a biasing battery "E." Diodes 34 and 36 are normally in a non-conducting state but are rendered conductive during blanking intervals by the application of suitable keying pulses 44 applied in the proper polarity to them. Thus, during those portions of the blanking intervals in which the signal is at black level upon the occurrence of a keying pulse 44, diode 34 will conduct a certain amount in order to discharge the capacitor 30 a certain amount if its charge should be reduced to provide the correct D.-C. reinsertion. Conversely, assuming that the charge on capacitor 30 is insufficient for a proper D.-C. level, it will be charged the necessary amount by conduction of diode 34. In accordance with this operation, restoration of the lost low frequency and D.-C. components of the signal by the action of the clamped circuit 32 also serves to fix the voltage of the control electrode 16 of the electron discharge device 10.

As thus far described, the apparatus shown in the drawing is substantially identical to that illustrated in the Wendt patent. Moreover, the circuit 32 as described is quite effective in clamping the control electrode of the electron discharge device 10 to a predetermined value as set by the battery "E" which, for given operating potentials and tube characteristics for the electron discharge device is a sufficient mode of establishing the D.-C. level of conduction in the tube. Assuming, however, that there occurs a drift in any one of the number of factors which contribute to the actual conduction of the tube (e. g., mutual transconductance, "+B" and the like), merely clamping its control electrode at a predetermined voltage will not produce the desired conduction therein.

In view of the foregoing and as has been stated briefly supra, the present invention provides means for accurately establishing the level of direct current conduction in the electron discharge device, which means performs its function on the basis of actual conduction within the tube rather than on a fixed bias reference. More specifically, a large isolating resistor 46 is connected to the cathode 18 of electron discharge device at one end, its other end being connected to the control electrode 48 of a conventional amplifier 50. Also connected to the latter terminus is a keyed sampling circuit or switch comprising diodes 52 and 54, the cathode of diode 52 and the anode of diode 54 being connected to each other and to the resistor 46. The other electrodes of the diodes 52 and 54 are connected, respectively, to the ends of a transformer secondary winding 56, the primary winding of the transformer being supplied with keying pulses 58 timed with respect to any suitable source such as the horizontal deflecting circuits of the associated television apparatus (not shown). The center of winding 56 is connected to the positive terminal of battery "E′" whose negative terminal is, as illustrated, connected to ground. During the picture portions of the signal 22 (i. e., those portions between consecutive blanking pedestals 24), the diodes 52 and 54 are maintained in a conductive state.

Battery "E′" may be considered as a reference voltage equal in value to the voltage desired to be developed across cathode resistor 20 in the electron discharge tube circuit during blanking intervals as a function of the cathode current. In order to set the level of D.-C. conduction in tube 10 as a function of its actual operation, the keyed sampling device comprising diodes 52 and 54 operates in the following manner: During a blanking interval, pulse 58 is applied to the diodes 52 and 54 in such polarity as to render them non-conductive, thereby opening the circuit between point "A" at the right-hand end of resisotr 46 and battery "E′." During the picture portions of the signal, however, the voltage at point "A" was equal to the battery voltage of source "E′," since the resistor 46 effectively isolated point "A" from the cathode of the electron discharge device. When the diodes 52 and 54 are rendered non-conductive during blanking intervals, the current flowing through cathode resistor 20 develops a voltage which appears at point "A" in place of the voltage from battery "E′." Thus, assuming that the current through resistor 20 is larger during a given blanking interval than its proper value, the voltage at point "A" when the diodes 52 and 54 are opened will be greater than the value of battery "E′," thereby applying a positive pulse 60 to the control electrode 48 of amplifier 50. The output of amplifier 50 is or may be further amplified by amplifier 62 and applied to input terminal "B" of a peak-to-peak detector comprising diodes 64 and 66. The cathode of diode 64 is connected to ground while the anode of diode 66 is connected to a point of the same potential, the other electrodes of these two diodes being connected to corresponding termini of capacitors 68 and 70, respectively. The anode of diode 64 is connected to one end of load resistor 72 while the cathode of diode 66 is connected to its other end, the midpoint of resistor 72 being connected to point "D" which is also connected to ground via a capacitor 74. In the operation of the peak-to-peak detector, pulse 60 appearing at its input terminal "D" is clamped below ground by diode 64 but is clamped above ground by diode 66, by reason of the charging and discharging of the capacitors 68 and 70.

From the foregoing, it will be seen that each branch of the peak-to-peak detector (i. e., the branch including capacitor 68 and diode 64 and the branch comprising capacitor 70 and diode 66) operates as a D.-C. restorer. Moreover, each half of resistor 72 forms, in conjunction with capacitor 74, an integrating circuit such that, for the polarity of the pulses shown, pulse 60*a*, upon passage through the integration circuit, will produce substantially negligible voltage at point "D." On the other hand, integration of pulse 60*b* will produce a negative D.-C. voltage at point "D" nearly equal to the amplitude of the pulse and of negative polarity. This negative D.-C. voltage is or may be further filtered by means such as resistor 76 and shunt capacitor 78 and applied to point "F" at the lower end of battery "E" to which the A.-C. midpoint of the keyed clamp circuit 32 is connected. The negative voltage at point "F" will, as persons skilled in the art should recognize, effect a lowering of the clamping potential of control electrode 16 of the electron discharge device to such value as to cause the proper magnitude of current flow through cathode resistor 20.

From the foregoing, it will be appreciated that, by reason of the isolating action of resistor 46, the cathode 18 of electron discharge device is substantially unaffected by the opening of diodes 52 and 54 during blanking intervals, so that the operation of the tube 10 is permitted to continue without influence from the sampling circuit except, of course, for the correction of its conduction as a result of the negative voltage applied to the keyed clamp circuit via point "F."

Conversely, if the conduction of tube 10 is less than its desired value during blanking, the pulse at point "A"

produced by the opening of diodes 52 and 54 will be negative in direction whereby to produce at points "D" and "F" positive D.-C. correcting voltages. In either case, the action of the keyed sampling circuit and the peak-to-peak detectors, in conjunction with the keyed clamp circuit, is that of setting the level of D.-C. conduction in tube 10 during blanking intervals as an exact matter, rather than as a function of an arbitrarily selected bias potential for the tube, as is the case in prior art devices. Additionally, the output of tube 10, illustrated by waveform 22', contains its proper D.-C. and low frequency components as indicated by the alignment of the blanking pedestals **24*a* along horizontal reference voltage line 22*b***. Thus, it will be understood that the present invention provides both D.-C. restoration and D.-C. level setting as a function of actual tube conduction.

Having thus described my invention, what I claim as new and desire to secure by Letters Patent is:

1. Apparatus for controlling the level of conduction of an electron discharge device which is adapted to be supplied with an electrical signal having regularly recurring reference portions but lacking its direct current component, said device having first and second conduction-controlling electrodes, such that the difference in potential between said electrodes determines the level of conduction of said device, which comprises: means connected to said first conduction-controlling electrode for clamping such regularly recurring reference portions of such signal to the same voltage level; a direct current path including an impedance from said second conduction-controlling electrode to a point of fixed potential such that the voltage across said impedance is proportional to the degree of conduction of said electron discharge device; a normally conducting electronic switch connected at one end to a source of reference potential and connected at its other end to a point on said direct current path for said second electrode, said latter connection including isolating means; means for periodically opening said switch coincidentally with such recurring portions of such signal whereby to produce a control signal, at the second-named end of said switch, proportional to the difference between said reference potential and the voltage across said impedance; means for measuring said control signal; and means coupling said measuring means to said clamping means in such manner as to establish said clamping level.

2. Apparatus as defined by claim 1 wherein said clamping means comprises a normally non-conducting keyed clamping circuit and means for rendering said circuit conductive coincidentally with each opening of said switch.

3. Apparatus as defined by claim 1 wherein said electronic switch comprises a pair of serially connected, unilaterally conductive devices and keying means for applying disabling pulses to said devices.

4. Apparatus as defined by claim 3 wherein the junction of said unilaterally conductive devices is connected to one end of said isolating means and wherein said isolating means comprises a resistor whose value is substantially greater than said impedance in said electrode path.

5. Apparatus as defined by claim 1 wherein said measuring means comprises means for detecting the amplitude and polarity of said control signal.

6. Apparatus as defined by claim 5 which further includes means for developing a direct current potential from the output of said measuring means.

7. Apparatus for controlling the level of conduction of an electron discharge device which is adapted to be supplied with an electrical signal having regularly recurring reference portions but lacking a direct current component, said device having first and second conduction-controlling electrodes such that the difference in potential between said electrodes determines the level of conduction of said device, said apparatus comprising: a normally non-conducting keyed clamp circuit connected to said first conduction-controlling electrode for clamping such recurring reference portions of such signal to the same voltage level; a direct current path for said electron discharge device comprising a resistor connected between said second electrode and a point of fixed potential whereby to develop a voltage across said resistor proportional to the degree of conduction of said electron discharge device; a normally closed electronic switch connected at one terminal to a source of reference voltage whose potential bears a predetermined relationship to the desired voltage across said resistor during such reference portions of such signal; an isolating resistor whose value is substantially greater than said first named resistor, one end of said isolating resistor being connected to an impedance point on said direct current path, the other end of said isolating resistor being connected to the terminal of said switch remote from its first-named terminal; means for opening said switch and for rendering said clamp circuit non-conductive during the occurrence of each such signal reference portion, such as to produce at the second-named end of said isolating resistor a pulse whose amplitude is proportional to the difference between the voltage across said first resistor and said reference voltage; means for detecting the amplitude and polarity of such developed pulse; integrating means coupled to and responsive to said measuring means for producing a direct current whose magnitude and polarity are a function of the amplitude and polarity of such pulse; and means for applying the output of said integrating means to said keyed clamp circuit in such manner as to establish said level to which it clamps such signal reference portions.

8. Apparatus as defined by claim 7 including means between the junction of said isolating resistor and said electronic switch and said measuring means for amplifying such pulse.

9. Apparatus for controlling the level of conduction of an electron discharge device which is adapted to be supplied with an electrical signal having regularly recurring reference portions, said device having means for determining the level of conduction of said device, which apparatus comprises: means connected to said electron discharge device for clamping such regularly recurring reference portions of such signal to a reference voltage level; a direct current path including an impedance in series with the current path of said device and connected to a point of fixed potential such that the voltage across said impedance is proportional to the degree of conduction of said electron discharge device; voltage sampling means connected in parallel with at least a portion of said impedance between a point of fixed potential and a point on said impedance; means for periodically rendering said sampling means operative during recurrent reference portions of such signal whereby to produce a control signal proportional to the voltage across said impedance; and means connected to said sampling means and to said clamping means and responsive to such control signal for establishing said reference voltage level.

References Cited in the file of this patent

UNITED STATES PATENTS

| | | |
|---|---|---|
| 2,144,995 | Pulvari-Pulvermacher | Jan. 24, 1939 |
| 2,171,671 | Percival | Sept. 5, 1939 |
| 2,299,945 | Wendt | Oct. 27, 1942 |
| 2,329,558 | Scherbatskoy | Sept. 14, 1943 |
| 2,531,600 | Barney et al. | Nov. 28, 1950 |
| 2,636,080 | Doba | Apr. 21, 1953 |
| 2,653,186 | Hurford | Sept. 22, 1953 |